(12) United States Patent
Duan et al.

(10) Patent No.: US 8,126,405 B2
(45) Date of Patent: Feb. 28, 2012

(54) METHOD FOR ESTIMATING CONDITION OF WIRELESS CHANNELS

(75) Inventors: Chunjie Duan, Medfield, MA (US);
Nayef Alsindi, Malden, MA (US);
Jinyun Zhang, Cambridge, MA (US)

(73) Assignee: Mitsubishi Electric Research Laboratory, Inc., Cambridge, MA (US)

( * ) Notice: Subject to any disclaimer, the term of this patent is extended or adjusted under 35 U.S.C. 154(b) by 483 days.

(21) Appl. No.: 12/368,813

(22) Filed: Feb. 10, 2009

(65) Prior Publication Data
US 2010/0203839 A1    Aug. 12, 2010

(51) Int. Cl.
*H04B 17/00*    (2006.01)
(52) U.S. Cl. ... 455/67.16; 455/63.1; 455/65; 455/67.11; 455/67.14
(58) Field of Classification Search ............... 455/67.11, 455/67.14, 63.1, 65
See application file for complete search history.

(56) References Cited

U.S. PATENT DOCUMENTS

| | | | |
|---|---|---|---|
| 5,974,329 A * | 10/1999 | Wylie et al. | 455/456.1 |
| 2005/0124368 A1* | 6/2005 | Diao et al. | 455/522 |
| 2006/0125690 A1* | 6/2006 | Goren et al. | 342/387 |
| 2008/0051103 A1* | 2/2008 | Goren et al. | 455/456.1 |
| 2010/0315289 A1* | 12/2010 | Nurmela et al. | 342/385 |

* cited by examiner

*Primary Examiner* — Joseph Chang
*Assistant Examiner* — Jeffrey Shin
(74) *Attorney, Agent, or Firm* — Dirk Brinkman; Gene Vinokur (57) ABSTRACT

A method measures a time from transmitting a ranging signal to receiving the ranging signal via a channel of a wireless network, and a received signal strength (RSS) of the ranging signal. A distance is estimated based on the time, and a path loss based on the RSS. Probabilities of conditions of the channel are estimated based on the distance and the path loss, wherein the condition is in one of line-of-sight (LOS), or non-LOS (NLOS).

4 Claims, 9 Drawing Sheets

METHOD FOR ESTIMATING CONDITION OF WIRELESS CHANNELS

FIELD OF THE INVENTION

This invention relates to wireless communication and localization, and more particularly, to estimating and identifying conditions of wireless channels.

BACKGROUND OF THE INVENTION

The conditions of channels are important to the performance of wireless networks. Wireless signals in a non-line-of-sight (NLOS) channel often suffer greater path loss, and therefore are less reliable for communication than a line-of-sight (LOS) channel of equal distance. If a wireless network is capable of detecting whether a path between two nodes is one of line-of-sight (LOS), partially blocked direct path NLOS (NLOS-DP), or no direct path NLOS (NLOS-NDP), then the network can route data to a different path to improve communication reliability.

Impact of Channel Condition in ToA Based Ranging

The distance between two nodes in wireless networks can be estimated using the received signal strength (RSS), or the time-of-arrival (ToA). ToA-based ranging is based on measuring a time t form when the signal is transmitted to when the signal is received. The distance is estimated as d=t*c, where c is the travel speed of the signal in the medium (for example, the electromagnetic wave travels in free space at $\sim 3 \times 10^8$ meters per second.

Figure 1A:
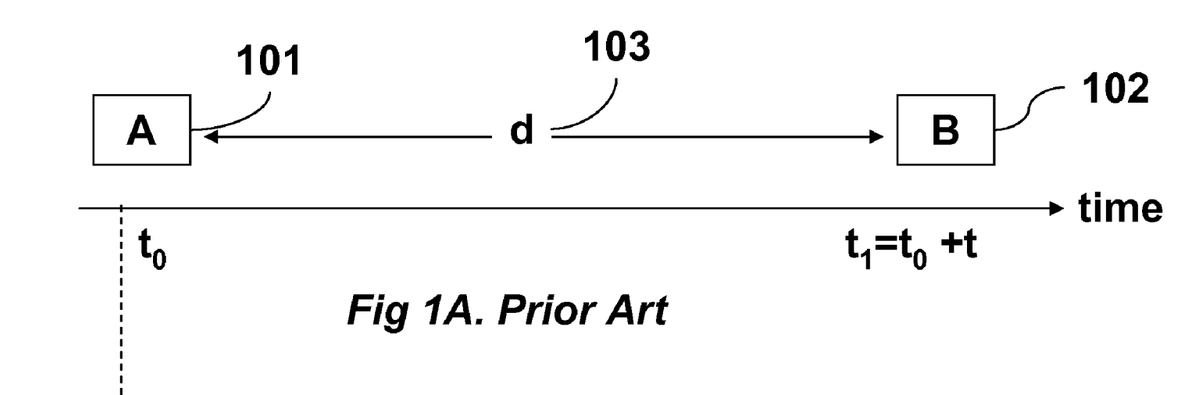
FIG. 1A is a block diagram of two nodes in a wireless network with a distance of d.

FIG. 1A shows two transceivers A 101 and B 102 separated by distance d 103.

Figure 1B:
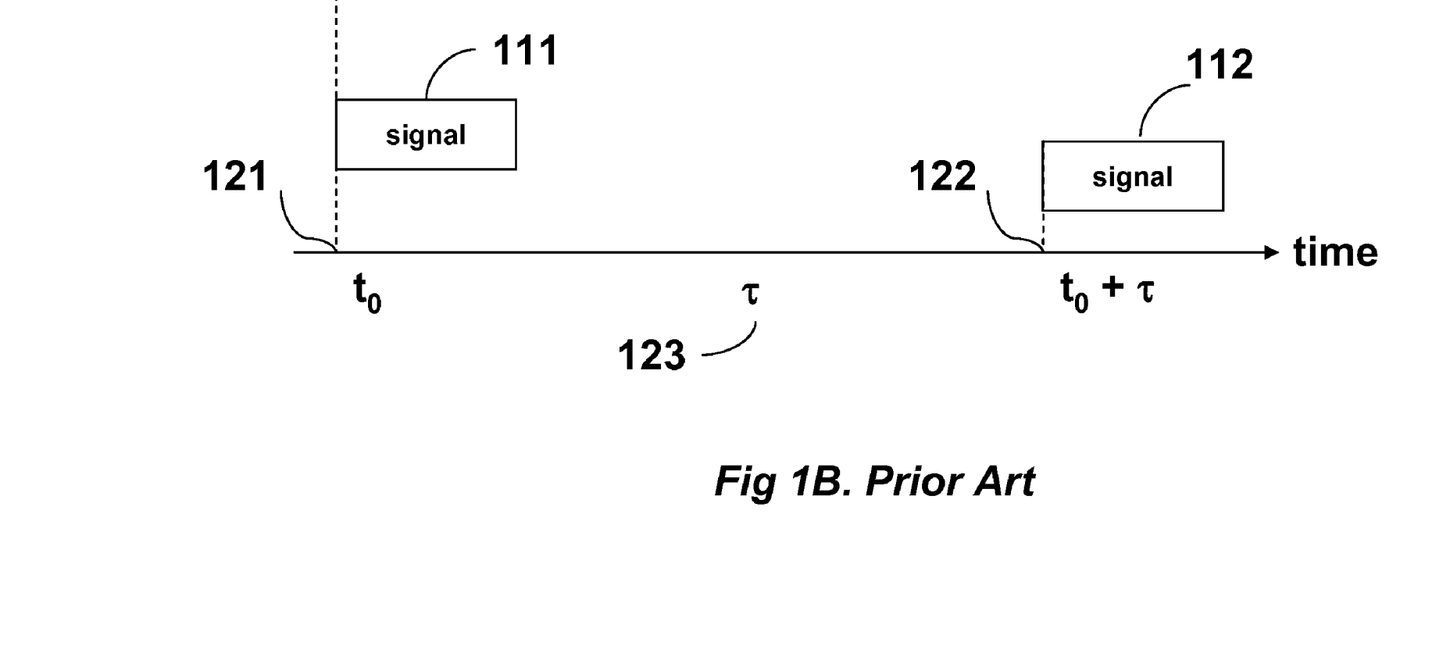
FIG. 1B is a schematic of the time of transmitted and received messages.

FIG. 1B shows that transceiver A transmits a wireless signal 111 at time instance $t_0$, and the signal is received at transceiver B 102, after a time τ 123, at time $t_1 = t_0 + \tau$. In ToA based ranging, time τ is the "flight" time used to estimate the distance d 103. The travel distance of the signal is estimated as d=τ*c.

Figure 2:
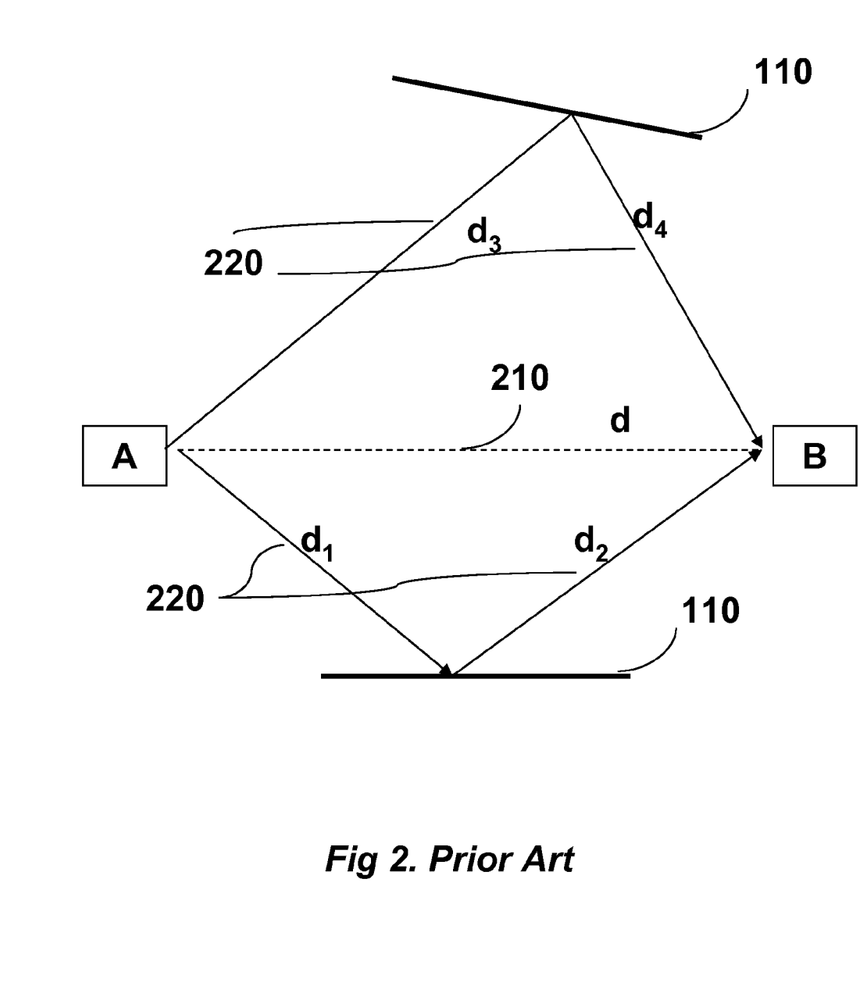
FIG. 2 is a schematic of a multipath wireless channels.

A wireless channel can include many paths as shown in FIG. 2. The direct path 210 between transmitter and the receiver is referred to as the Line-of-Sight (LOS) path. Indirect paths that are reflective paths are referred to as the Non-Line-of-Sight (NLOS) paths.

The total travel distance of NLOS paths is greater than the LOS path. For instance, lengths 220 of two NLOS paths are $d_1 + d_2 > d$ and $d_3 + d_4 > d$.

Generally the ToA is estimated based on the earliest arrival of the signal and the distance is $$\hat{d}_{ij} = d_{ij} + z_{ij} + \epsilon_{ij},$$

where $d_{ij}$ is the LOS distance, $z_{ij}$ is the NLOS bias with the value of zero in LOS channels and positive in NLOS channels, and $\epsilon_{ij}$ is a measure error, with a zero-mean Gaussian distribution.

Figure 3A:
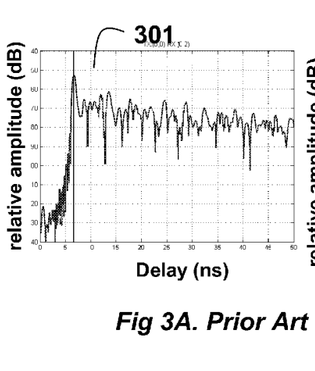
FIGS. 3A-3C are graphs of channel power-delay-profiles (PDPs)

FIG. 3A shows the power-delay-profile (PDP) of a LOS channel. The direct path is the strongest component, and appears at the time 301 when the direct path is expected. The ToA estimation therefore contains very small error.

Figure 3B:
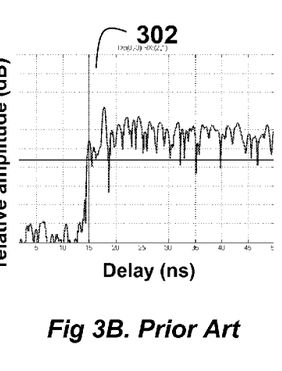

FIG. 3B shows the PDP of a NLOS channel in which the direct path is attenuated, but detectable (NLOS-DP channel). The direct path is not the strongest component and there are some energy appears at the time when the direct path is expected. As a results, the error of the time 302 of arrival estimation is larger than in a LOS channel.

Figure 3C:
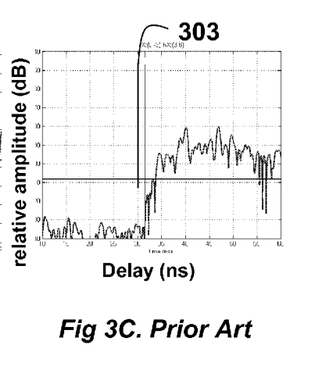

FIG. 3C shows the PDP of a NLOS channel in which the direct path is attenuated and completed not detectable (NLOS-NDP channel). The direct path is not the strongest component and cannot be detected at the time when the direct path is expected. The earliest detectable signal is at time 303, instead of time 301 or 302. As a result, the ToA estimation can have significantly larger error compared to two other channel conditions. The major portion of the error is contributed by the NLOS bias because $z_{ij} \gg \tau_{ij}$.

Impact of Position Estimation in Wireless Networks

Figure 4:
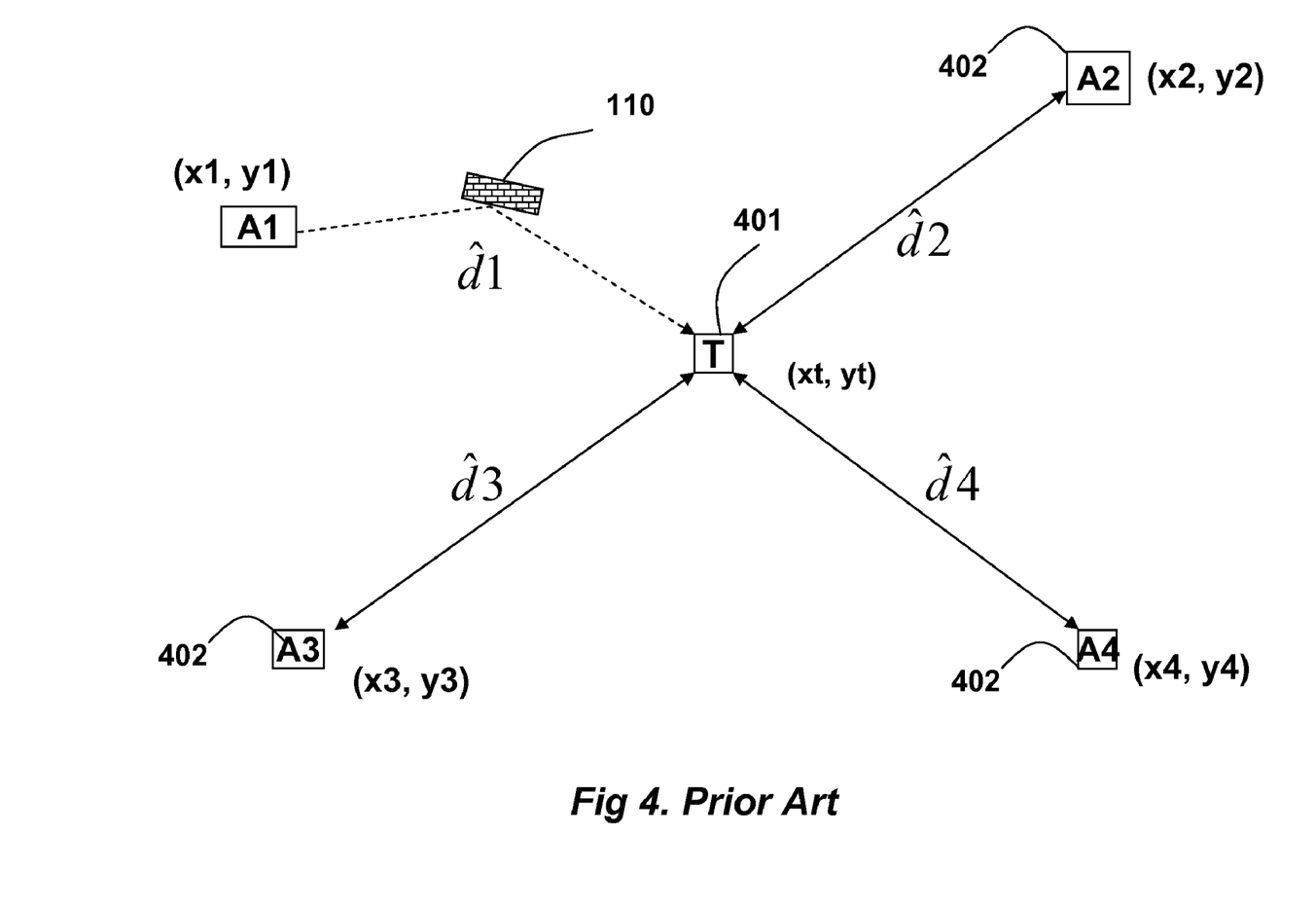
FIG. 4 is a schematic of a simple wireless localization network.

The localization of nodes in a wireless network can be performed using wireless signals. FIG. 4 shows an example network. Assuming a target node T 401, whose location is to be estimated, is wirelessly connected to M nodes $A_1, A_2, \ldots A_M$ 402, with known locations. These nodes are referred to as anchor (A) nodes, and their locations are $(x_1, y_1), (x_2, y_2), \ldots (x_M, y_M)$. Also, assuming the distance estimation between the node T and the anchor node $A_i$, is available as $\hat{d}_i$, then the location of the node T can be estimated as $\hat{\theta} = [\hat{x}, \hat{y}]$, using a least square (LS) position estimator, which is $$\hat{\theta} = \operatorname*{argmin}_{x,y}([[\hat{d} - F(\hat{\theta})][\hat{d} - F(\hat{\theta})]^T),$$

where $\hat{d} = [\hat{d}_1 \ldots \hat{d}_M]$ is a range measurement vector, and $F(\hat{\theta})$ is the computed distance at the estimated location of the node T location, given as $$F(\hat{\theta}) = \begin{bmatrix} \sqrt{(\hat{x} - x_1)^2 + (\hat{y} - y_1)^2} \\ \cdots \\ \sqrt{(\hat{x} - x_M)^2 + (\hat{y} - y_M)^2} \end{bmatrix}.$$

The LS estimator treats each estimated distance, $\hat{d}_i$ equally. However, the distance $\hat{d}_1$ can be inaccurate because it a reflected by an object 410. If the distance estimation is accurate, then the position solver returns the estimated position of node T, i.e., $\hat{\theta} = [x_T, y_T]$.

If errors in all of the distance estimations are equal or close, then the LS estimation using all available anchor nodes generally returns a more accurate estimation compared to an LS estimation using only a subset of the anchor nodes.

If one or more distance estimations contain error, which is significantly larger than others, the LS position estimator, or any other method that treats all distances equally, produces results with an increased error.

If a given distance measurement $\hat{d}_i$ has a large error, then a position estimation method, which discriminates the distance measurements during the position estimation, can be used to achieve position error performance improvement. One of such methods uses a weighted-least-square (WLS)

$$\hat{\theta} = \operatorname*{argmin}_{x,y}([[\hat{d} - F(\hat{\theta})]W[\hat{d} - F(\hat{\theta})]^T),$$

where $W = [W_1\ W_2\ \ldots\ W_M]$ is a weight vector, $W_i$ is the weight assigned to the $i^{th}$ distance measurement. A larger weight is assigned to a distance measurement with a greater confidence score. Conversely, if a distance measurement has a large error and low confidence, a small weight is assigned.

For the WLS method to have good performance, the correct weight assignment is critical.

Prior Art Channel Classification

Several channel condition classification methods are known.

"Channel statistics" (such as RMS delay spread) can be used to identify NLOS channels. That method is computationally complex, and energy inefficient, because multiple range measurements are needed per channel to determine channel statistics.

"Frequency diversity" can also be used to identify the direct-path blockage. Based on channel measurements in a typical indoor environment, the variation of ToA estimation across frequency sub-bands has a positive correlation with the channel condition. That approach requires a frequency hopping capable radio frequency (RF) front end, and therefore the transceivers have higher cost, complexity, and power consumption. It is also difficult to isolate the frequency dependency of the antennas from the channel, which directly impacts the effectiveness of that approach.

"Running variance" is another method for channel condition identification. It computes the variance of subsequent range estimates, and compares the variances with a predetermined threshold to decide between LOS and NLOS. That method has high computation complexity, and is energy inefficient.

"Change of SNR" method detects sudden change of SNR to determine whether the channel is moving from LOS to NLOS, or vise versa.

SUMMARY OF THE INVENTION

The embodiments of invention provide a method for estimating wireless channel condition based on measured Time-of-Arrival (ToA) and Received-Signal-Strength (RSS).

The method provides reliable estimation. The method has low complexity and can be implemented with at a low cost because that RSS is readily available at the receiver.

DETAILED DESCRIPTION OF THE PREFERRED EMBODIMENTS

According to embodiments of our invention, $C_0$, $C_1$ and $C_2$ denote three channel conditions: line of sight LOS, partially blocked direct path NLOS (NLOS-DP) and no direct path NLOS (NLOS-NDP), respectively.

The objective of our invention is to estimate the likelihood if a channel is in one of the three channel conditions, $C_i$, i={0, 1, 2}, based on the ToA-based distance estimate $\hat{d}$, and RSS measurement $\hat{r}_{RSS}$. The likelihood can be expressed by a conditional probability, $p(C_i|\hat{d},\hat{r}_{RSS})$.

The conditional probability $p(C_i|\hat{d},\hat{r}_{RSS})$ can be computed using Bayes' equation given by $$p(C_i, | \hat{d}, \hat{r}_{rss}) = \frac{f(\hat{r}_{rss}|C_i, \hat{d})p(C_i|\hat{d})}{\sum_{k=0}^{2} f(\hat{r}_{rss}|C_i, \hat{d})p(C_k|\hat{d})}. \quad (1)$$

where $f(\hat{r}_{RSS}|C_i,\hat{d})$ is the distribution of the signal power for a given channel condition $C_k$ at a ToA estimated distance $\hat{d}$. $p(C_i|\hat{d})$ is the probability of the channel condition given the ToA estimated distance.

A priori information $f(\hat{r}_{RSS}|C_i,\hat{d})$ can be obtained through channel measurements and modeling of the path-loss $PL=P_t-r_{rss}$, which defines the distance-power relationship. The mean of $f(\hat{r}_{RSS}|C_i,\hat{d})$ is the average path-loss in wireless channels, PL. The relationship of the average path-loss and antenna separation normally can be expressed using a simple model given by $$PL=P_0+10n \log(d)+\chi, \quad (2)$$

where $P_0$ is the path-loss at a fixed distance, typically at 1 meter, n is the path loss exponent and $\chi$ is the shadow fading component, generally modeled as a lognormal distribution. This model is valid for LOS channels.

The values of n and $P_0$ are normally channel condition dependent. For NLOS channels, the path-loss can be modeled as a two-piece model.

$$PL = \begin{cases} P_0 + 10n_1\log(d) + \chi_1 & d \leq d_{break} \\ PL(d_{break}) + 10n_2\log(d/d_{break}) + \chi_2 & d > d_{break} \end{cases}, \quad (3)$$

where $n_1$, $n_2$, $\chi_1$ and $\chi_2$ are path-loss exponent and the shadow fading before and after the break distance $d_{break}$. These values vary in different channel conditions due to the different degrees of shadowing.

Figure 5:
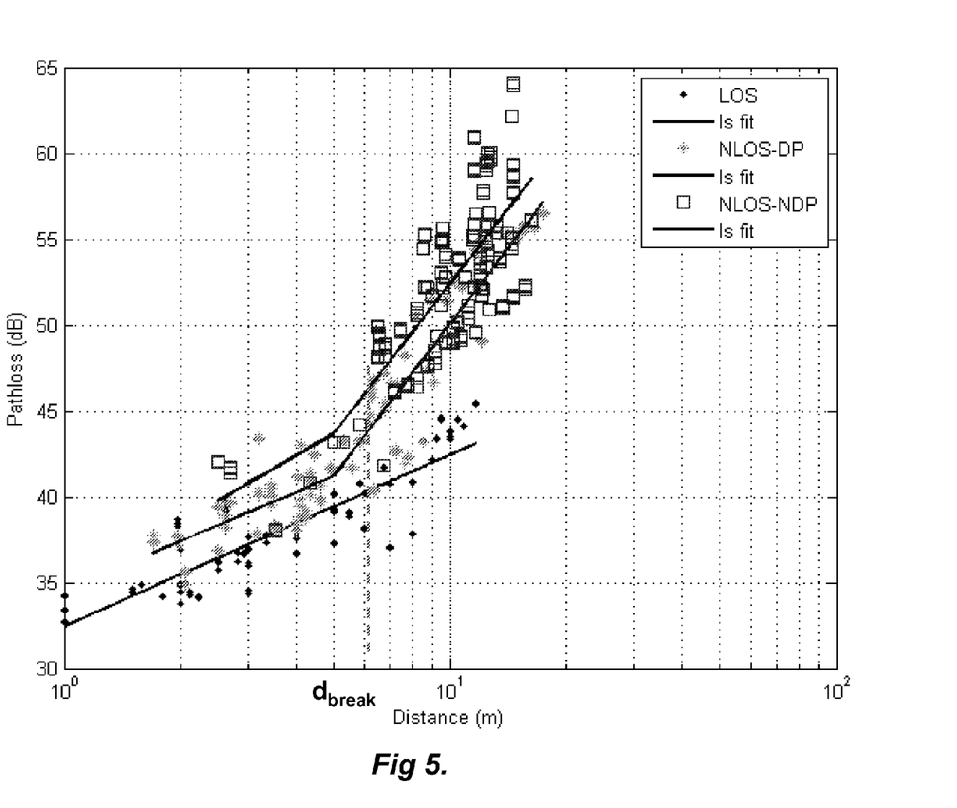
FIG. 5 are graphs comparing measured and calculated path-loss over distance.

FIG. 5 shows such relationships for channels $C_0$, $C_1$ and $C_2$. The measurement results are also shown in FIG. 5.

Here, $f(\hat{r}_{RSS}|C_i,\hat{d})$ is a distribution with the mean computed based on Equations (2) and (3).

Figure 6:
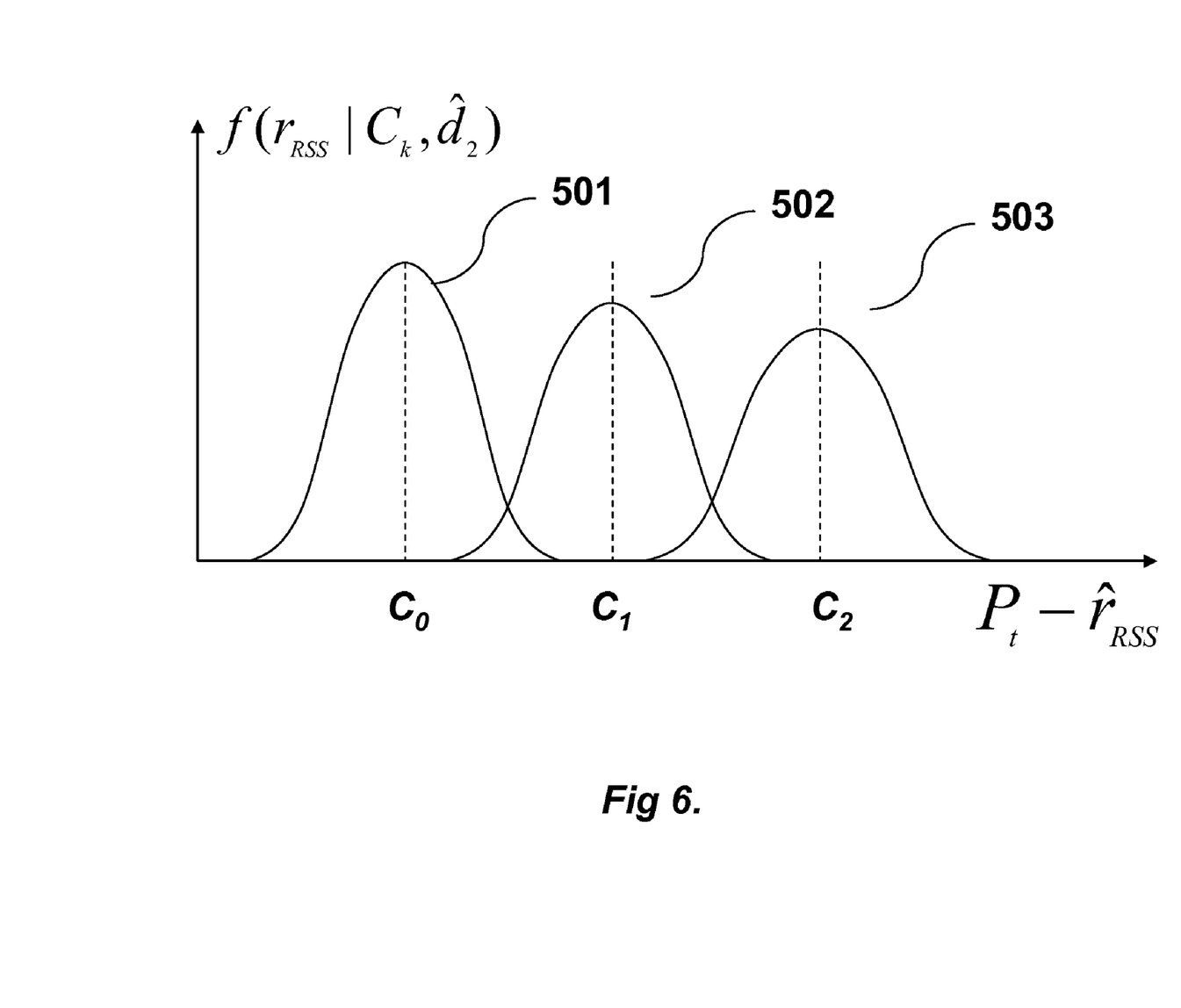
FIG. 6 are distributions of received signal strength for different channels at a given distance.

FIG. 6 shows the distributions of $\hat{r}_{RSS}$ for all three channel conditions at given distance $\hat{d}$.

$p(C_i|\hat{d})$ can be obtained using the Bayes' equation given by $$p(C_i, | \hat{d}) = \frac{f(\hat{d} | C_i)p(C_i)}{\sum_{k=0}^{2} f(\hat{d} | C_k)p(C_k)}, \quad (4)$$

where $f(\hat{d}|C_i)$ is the distribution of the ToA estimated distances given the channel condition and $p(C_i)$ is the probability of channel being under condition $C_i$.

$f(\hat{d}|C_i)$ is the distribution of the ToA estimated distances, given the channel condition. Generally, $f(\hat{d}|C_0)$ is distance independent within the range. $f(\hat{d}|C_1)$ and $f(\hat{d}|C_2)$ are distance dependent. Intuitively, $f(\hat{d}|C_2)$ is monotonically increasing, and $f(\hat{d}|C_1)$ is monotonically decreasing within the communication range $d_c$. Equation (5), (6) and (7) are distributions satisfy these requirements.

$$f(\hat{d} \mid C_0) = \begin{cases} \frac{1}{d_c}, & d \leq d_c \\ 0, & d > d_c \end{cases} \quad (5)$$

$$f(\hat{d} \mid C_1) = \begin{cases} \frac{2(d_c - d)}{(d_c)^2}, & d \leq d_c \\ 0, & d > d_c \end{cases} \quad (6)$$

$$f(\hat{d} \mid C_2) = \begin{cases} \frac{2d}{(d_c)^2}, & d \leq d_c \\ 0, & d > d_c \end{cases} \quad (7)$$

Figure 7:
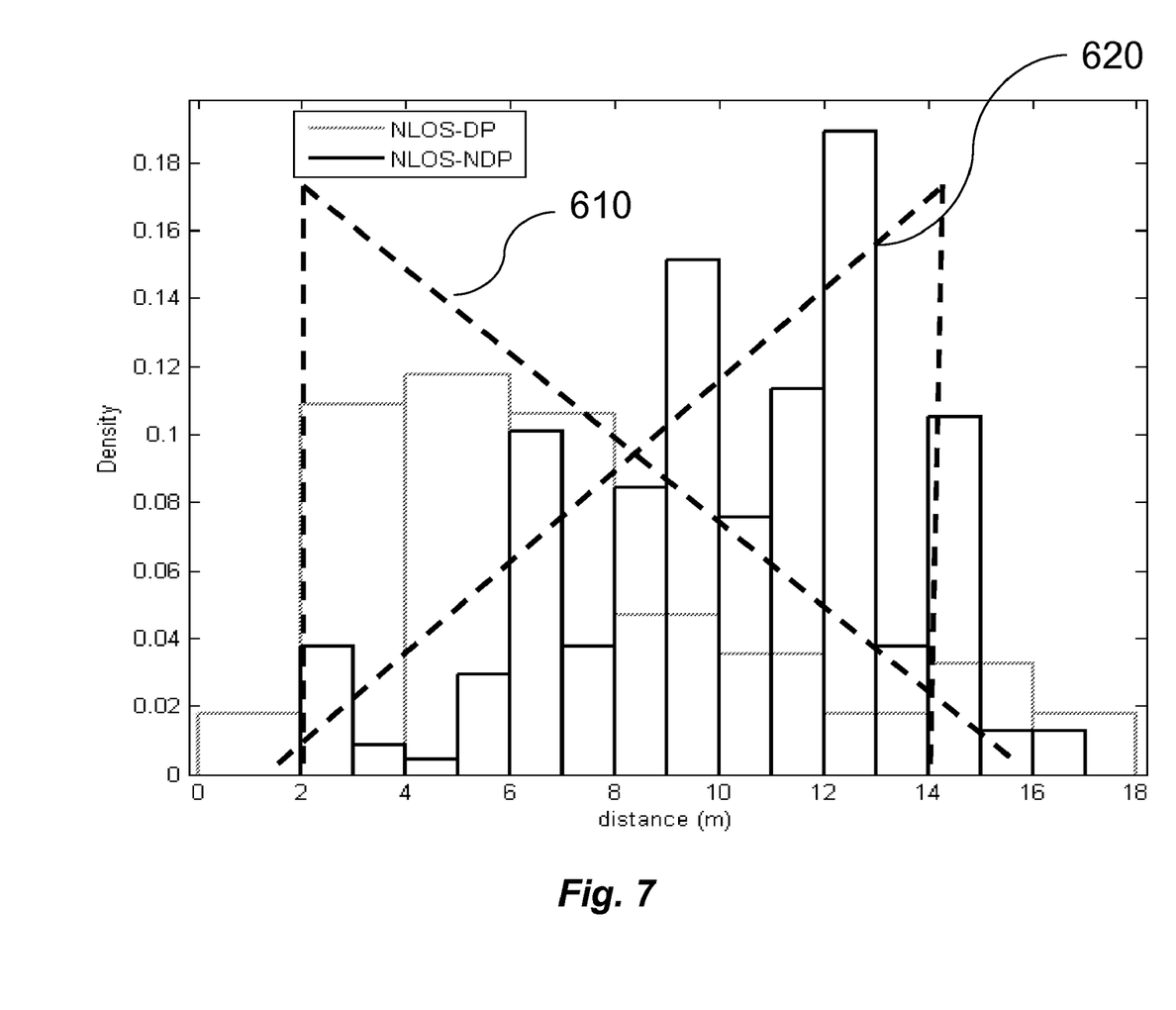
FIG. 7 is a histogram of distributions of NLOS-NP and NLOS-NDP channel conditions over distance.

FIG. 7 shows $f(\hat{d}|C_1)$ and $f(\hat{d}|C_2)$ based on actual measurements. It also shows the distribution given by Equations (6) and (7).

Weight Assignment Scheme

After the channel condition probabilities are computed using the above equations, we can then generate a weight for the channel. A hard weight or a soft weight can be generated.

Hard Weight

We select the channel that satisfies the following condition $$C_k = \underset{C_k}{\arg\max}\, P(C_k \mid \hat{d}, \hat{r}_{rss}), \quad (8)$$

where arg max returns the argument which maximize the probability, $p(C_k|\hat{d},\hat{r}_{RSS})$, i.e., the channel condition with highest probability. Then, we assign a weight to the channel based on the selected channel, i.e., $w=w(C_k)$.

Soft Weight

The weight of a given channel is computed by $$w = \frac{\sum_{k=0}^{2} G_k p(C_k, \mid \hat{d}, \hat{r}_{rss})}{\sum_{k=0}^{2} p(C_k, \mid \hat{d}, \hat{r}_{rss})}, \quad (9)$$

where k is index for different channel conditions, $G_k$ is the corresponding weight for channel condition $C_k$.

The weight of the channels can then be used by a positioning method, e.g., the WLS positioning method.

General Method

Figure 8:
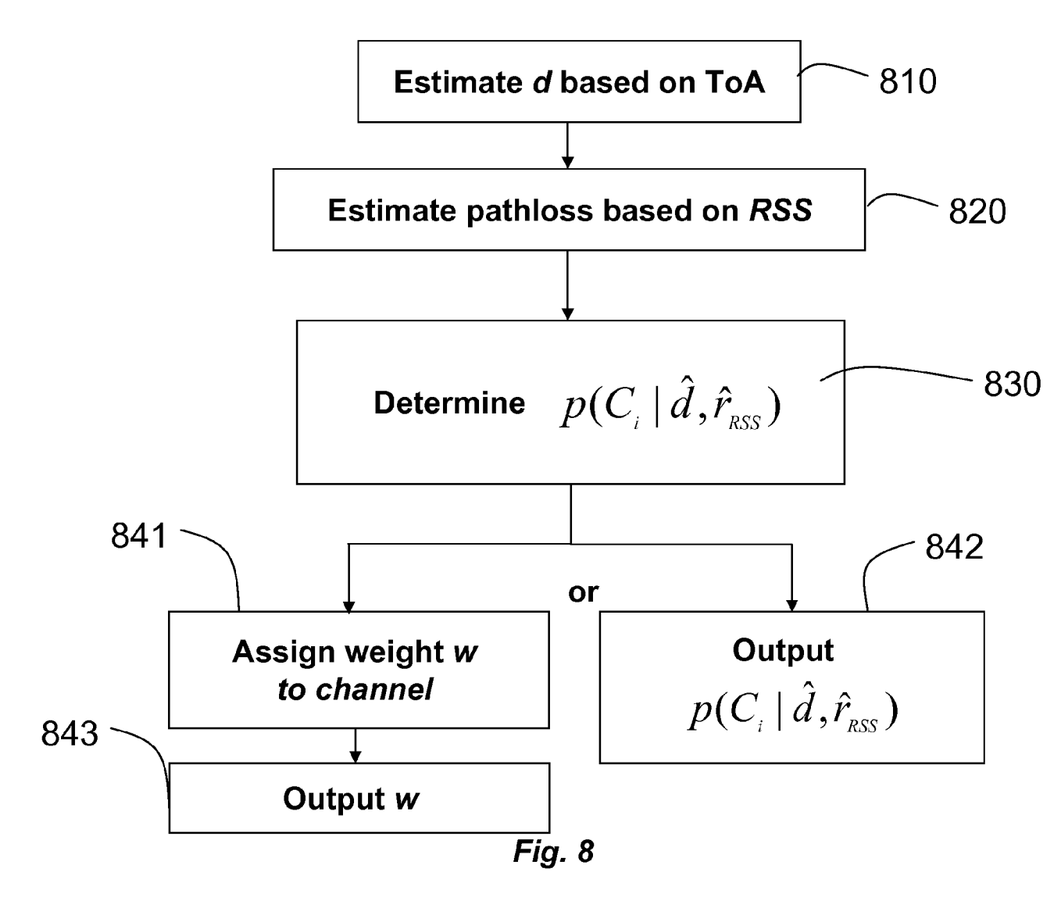
FIG. 8 is a flow diagram of a method for estimating channel conditions according to embodiments of the invention.

FIG. 8 shows the method for estimating a channel condition according to embodiments of the invention. A distance d is estimated 810 based on the time of arrival (ToA) of the ranging signal. A path loss is estimated 820 based on a received signal strength (RSS) of the ranging signal.

A conditional probability of the channel condition, $p(C_i|\hat{d}, \hat{r}_{RSS})$, is determined 830 according to the embodiment. The process can then either output $p(C_i|\hat{d},\hat{r}_{RSS})$ directly 842, or assign 841 a weight w first, and then output the weight 843.

Figure 9:
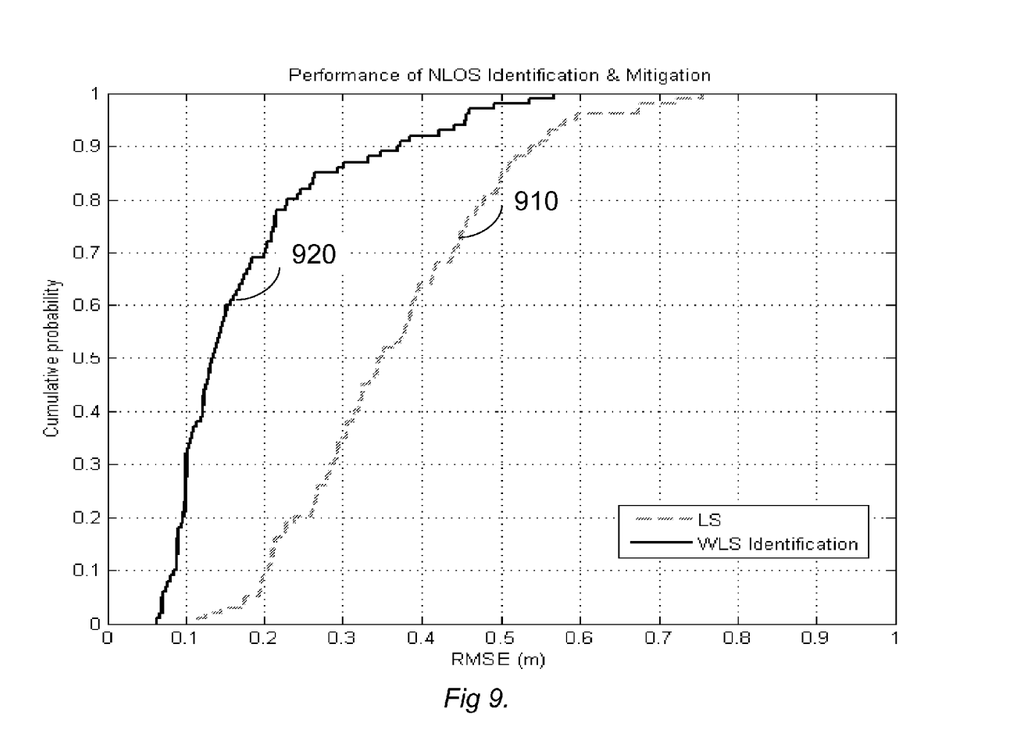
FIG. 9 is a graph comparing a position error for a localization method using least square (LS) and a weighted-least-square (WLS) using the channel condition estimation and soft weight assignment method according to embodiments of the invention.

FIG. 9 shows the cumulative-distribution-function (CDF) of the root-mean-square-error (RMSE) of the location estimation. Without the weight information, the LS algorithm performance is plotted as curve 910. Using the weight generated using the invented method, the CDF of the location RMSE is curve 920. We can see on average an over 40% improvement.

EFFECT OF THE INVENTION

Compared with conventional methods, the invention has the following advantages.

The invention reliably estimates the LOS/NLOS condition of wireless channels.

The invented method produces probabilities of three channel conditions. The probabilities can be used to generate hard or soft weight for each wireless channel.

The weight can be subsequently used by the localization method to improve the accuracy. The estimated channel condition probability can be used by other applications to improve communication reliability.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a condition of a channel between a receiver and a transmitter in a wireless network, comprising the steps of:
    measuring a time from transmitting a ranging signal to receiving the ranging signal via a channel of a wireless network;
    measuring a received signal strength (RSS) of the ranging signal;
    estimating a distance between the transmitter and receiver based on the time;
    estimating a path loss between the receiver and the transmitter based on the RSS;
    estimating probabilities of conditions of the channel based on the distance and the path loss, wherein the conditions include line-of-sight (LOS) and non-LOS (NLOS), wherein each condition is assigned a weight based on the probabilities and further comprising:
    selecting the condition with a highest probability, and wherein the condition is $$C_k = \underset{C_k}{\arg\max}\, P(C_k \mid \hat{d}, \hat{r}_{rss}),$$

where arg max returns the argument which maximize the probability $p(C_k|\hat{d},\hat{r}_{RSS})$, wherein $\hat{d}$ is the estimated distance, $\hat{r}_{RSS}$ is the estimated RSS; and further comprising:
    assigning a weight w to the channel as $w=w(C_k)$.

2. The method of claim 1, wherein the NLOS channel conditions include partially blocked direct path NLOS (NLOS-DP) and no direct path NLOS (NLOS-NDP).

3. The method of claim 1, further comprising:
    assigning a weight corresponding to the condition to each channel; and
    combining the probabilities of all conditions to produce the weight for the channel.

4. The method of claim 3, where in the weight is $$w = \frac{\sum_{k=0}^{2} G_k p(C_k, \mid \hat{d}, \hat{r}_{rss})}{\sum_{k=0}^{2} p(C_k, \mid \hat{d}, \hat{r}_{rss})}, \quad (9)$$

where k is index for the conditions, $G_k$ is a corresponding weight for channel condition $C_k$, $\hat{d}$ is the estimated distance, $\hat{r}_{RSS}$ is the estimated RSS.

* * * * *